United States Patent [19]
Koff et al.

[11] Patent Number: 5,282,718
[45] Date of Patent: Feb. 1, 1994

[54] CASE TREATMENT FOR COMPRESSOR BLADES

[75] Inventors: Steven G. Koff, Palm Beach Gardens, Fla.; Robert S. Mazzawy, South Glastonbury; John P. Nikkanen, West Hartford, both of Conn.; Nick A. Nolcheff, Palm Beach Gardens, Fla.

[73] Assignee: United Technologies Corporation, Hartford, Conn.

[21] Appl. No.: 924,611

[22] Filed: Aug. 3, 1992

Related U.S. Application Data

[63] Continuation-in-part of Ser. No. 648,510, Jan. 30, 1991, abandoned.

[51] Int. Cl.$^5$ .............................................. F01D 1/12
[52] U.S. Cl. .................... 415/57.3; 415/57.4; 415/914; 415/58.7
[58] Field of Search ................ 415/52.1, 57.3, 57.4, 415/58.1, 58.6, 58.7, 914, 144.145

[56] References Cited

U.S. PATENT DOCUMENTS

| 743,883 | 11/1903 | Kalbach | 415/57.4 |
|---|---|---|---|
| 948,692 | 2/1910 | Dodd | 415/57.4 |
| 1,349,487 | 8/1920 | Bennett | 415/57.4 |
| 2,709,917 | 6/1955 | Bruynes | 415/914 |
| 3,011,762 | 12/1961 | Pouit | 415/914 |
| 3,189,260 | 6/1965 | Ivanov . | |
| 3,580,692 | 5/1971 | Mikolajezak . | |
| 4,086,022 | 4/1978 | Freeman et al. | 415/914 |
| 4,212,585 | 7/1980 | Swarden et al. | 415/58.6 |
| 4,239,452 | 12/1980 | Roberts, Jr. . | |
| 4,375,937 | 3/1983 | Cooper | 415/914 |
| 4,630,993 | 12/1986 | Jensen | 415/914 |
| 4,673,331 | 6/1987 | Kolb | 415/914 |
| 4,990,053 | 2/1991 | Rohne | 415/914 |

FOREIGN PATENT DOCUMENTS

| 11405 | 1/1977 | Japan | 415/144 |
|---|---|---|---|
| 504214 | 4/1939 | United Kingdom | 415/144 |

OTHER PUBLICATIONS

ASME vol. 109, Mar. 1987 Improvement of Unstable characteristics of an Axial Flow Fan by Air-Separator Equipment—Y. Mijake et al.
Cransfield Institute of Tech. Feb. 1988, Appl. of Recess vaned treatment to Axial Flow Compressors—A. R. Azimian et al.

*Primary Examiner*—John T. Kwon
*Attorney, Agent, or Firm*—Norman Friedland

[57] ABSTRACT

The outer shroud of an axial flow compressor is treated to remove the low momentum flow adjacent the tips of the compressor blades in a judiciously located and sized passageway that removes the low momentum flow relative to the rotor blades at a location downstream of the blades' leading edge and returned at a location upstream of the point of removal. It being critical that no more than 12% of the total flow in the compressor rotor is removed for treatment. Anti-swirl vanes in the passageway serve to remove or reverse the swirl component from the removed low momentum flow. The intake is so designed that it selectively removes only the weak low momentum flow relative to the rotor and encourages the strong mainstream flow to remain in the main gas stream.

4 Claims, 2 Drawing Sheets

CASE TREATMENT FOR COMPRESSOR BLADES

This application is a continuation-in-part of Ser. No. 648,510 filed Jan. 30, 1991, which is abandoned now.

CROSS REFERENCE

The subject matter of this application is related to the subject matter of U.S. application Ser. No. 07,648,499 entitled "Rotor Case Treatment", commonly assigned and filed on even date herewith.

TECHNICAL FIELD

This invention relates to gas turbine engines and more particularly to means for enhancing stall margin of the compressor without adversely impacting efficiency by incorporating a treatment to the case of the compressor.

BACKGROUND ART

As is well known, surge or stall is a phenomenon that is characteristic to all types of axial flow compressors and occurs at a given engine operating condition and that if gone unattended could be deleterious or harmful to not only the engine's performance but to the engine itself.

Hence, throughout the entire evolution from the original design through the development and the improvement stages of a gas turbine engine, those involved in this technology pay great heed to the surge characteristics of the rotating machinery to assure that the compromise between the safe operation of the engine and its performance is optimized.

Since the point at which stall may occur limits the blades operating pressure ratio for a given corrected air weight flow and since higher pressure ratios enhance its performance, the engine's operating line is dictated by a compromise between the stall line and performance. Hence, it is always desirable to be able to raise the stall line to a higher pressure ratio for a given engine operation. For example, raising the stall line can increase the stall margin between the engine's operating line, or raising the stall line permits raising of the operating line without changing the stall margin, which obviously would result in an increase in engine's performance. Other alternatives can use up the increased stall margin with reduced rotor speed, reduced blade count, reduced rotor chord length, or eliminated variable geometry to improve component efficiency or lower component weight and complexity.

Experience has shown that because there are so many factors affecting stall it is not surprising that the stall line may not match its design point. In these situations the engine's hardware is typically modified to satisfy the stall margin requirement so as to meet engine specifications. It is also not surprising that this cannot always be done without degrading engine performance. This is not to say that there aren't other advantages that are attendant an increase in stall margin.

Thus, it is ideal to be able to increase the stall margin and at the same time obtain corresponding increase in engine performance. Of course, the next best would be to be able to increase stall margin without incurring an engine performance deficit.

As is well known, and as to be understood for purposes of understanding the invention, rotating stall is a phenomenon that occurs whenever sufficient blades or regions of the blades stall so as to occasion a complete blockage or reversal of flow of air through the compressor. Also flow separation on the airfoils can lead to compressor stall or rotation stall which, in turn, can lead to an overall system breakdown of the flow, i.e., surge.

Hence, whenever stall occurs and is allowed to propagate throughout the entire or nearly entire blading, surge can ensue. It is important to understand that the surge problem can be corrected by either providing means for handling an incipient surge or design the engine so that the engine never operates where a stall can manifest. For example, an incipient stall may be corrected simply by reducing engine power as compared to designing the engine so that its operating parameters assure that the engine always operates below a given stall line.

Also, it is well-known in the art that surge may manifest in many different forms and stall may occur in one or more blades and at different regions. The most limiting stall characteristics often occur at the tip of the blade which essentially is the type of stall being addressed by this invention. More particularly, this invention is directed to enhance the stall line so as to avoid the manifestation of an incipient stall. This will serve to prevent compressor stall although it will be understood that the treatment of the casing does not affect whether or not a rotating stall could degenerate into a surge condition.

Treatment of the casing, which sometimes is referred to as shroud or tip seal or outer air seal, to enhance the stall line is exemplified in the prior art, for example, by U.S. Pat. No. 4,239,452 granted to F. Roberts, Jr. on Dec. 16, 1980, and assigned to the assignee of this patent application. This patent discloses that axially extending skewed grooves and circumferentially extending grooves in the blade tip shroud enhance stall characteristics and is particularly efficacious in use with a fan.

U.S. Pat. No. 3,580,692 granted to A. Mikolajczak on May 25, 1971 also assigned to the assignee common to this patent application teaches a honeycomb structure casing treatment for enhancing the stall characteristics.

Other casing treatments that are known in the prior art are, for example, disclosed in the ASME paper reported in the Journal of Fluid Engineering Vol. 109 dated May 1987 entitled "Improvement of Unstable Characteristics of an Axial Flow Fan by Air-Separator Equipment" authored by Y. Mijake, T. Inola and T. Kato, and in a paper from The School of Mechanical Engineering, Cranfield Institute of Technology in Great Britain entitled "Application of Recess Vaned Casing Treatment to Axial Flow Compressor", dated Feb. 1988 and authored by A. R. Aziman, R. L. Elder and A. B. McKenzie. The work presented in these papers is based in part on earlier work of S. K. Ivanov disclosed in his U.S. Pat. No. 3,189,260 granted on Jun. 15, 1965.

The Ivanov patent and the Miyski et al paper, supra, both investigate properties of air separators for industrial fans that operate at relatively low speeds and low aerodynamic loadings while the Aziman et al paper, supra, investigates properties of air separators operating at similar low speeds but with aerodynamic loadings that are encountered in aerospace applications.

In the main, the teachings disclosed in the two papers and the Ivanov patent, supra, relate to mechanisms that collect rotating stall cells in post-stall operation in a significantly large recess formed in the casing, turn and reorient the flow and then reintroduce the collected air back into the main compressor flow upstream of the rotor.

Obviously, since rotating stall is a mass of cells of stalled and highly turbulent air that processes around the rotor at a rate that is nearly half the rotating speed of the rotor and extends upstream of the rotor a significant axial distance, one skilled in the art armed with these teachings is led to believe that in order to enhance the stall line it follows that the recess should be large enough to swallow the rotating stall. Hence, knowing that rotating stall extends a significant distance upstream of the rotor and since it is a collection of a large mass of stalled air cells, a significantly large recess would be necessary in order to swallow the rotating stall. These teachings, while particularly relevant to industrial types of fans and compressors are not relevant to aircraft application inasmuch as a large recess in the casing at the inlet of the engine or in front of a compressor is intolerable. In a sense, these papers teach away from the present invention, notwithstanding the fact that both the prior art and the present invention teach means for enhancing the stall line.

A particular problem inherent in axial compressor design is the limited space available for treatment of the case. It should be understood that the amount of air removed from the compressor is significantly different, percentage wise, than the amount of air for treatment of the fan, and the amount is deemed critical. It was found that a suitable amount of air used for treatment is substantially up to 12 percentage of the total air ingested by the compressor blades in a given compression stage. The amount of air recirculated depends on the ratio of the hub radius to the tip radius; and a larger percentage of the total air ingested is required for the higher hub-to-tip radius ratios found in high pressure compressors. Moreover, it was found that it was abundantly important to remove or even reverse the swirl in a single turning of the treated air. In this light, the passage used for treating the air is judiciously oriented so that the air flows angularly relative to the main flow stream through the blading.

STATEMENT OF THE INVENTION

An object of this invention is to enhance stall margin of a compressor of a gas turbine engine by an improved case treatment.

A feature of this invention is to provide an improved case treatment for separating low rotor relative momentum flow which has mostly a high swirl component in the absolute frame out of the main flow path and reintroducing the flow into the flow path at a higher velocity with the elimination or reversal of the swirl component.

A feature of this invention is the removal of low rotor relative momentum flow adjacent the casing of the compressor rotor and reintroducing the flow back into the mainstream upstream from the removal juncture, where the amount of removed flow is no greater than 12% of the main flow in the compressor.

BEST MODE FOR CARRYING OUT THE INVENTION

The invention described herein can be used to desensitize compressor stall margin to variations in rotor tip clearances that are primarily encountered during jet engine transients. In an engine acceleration, for example, the high compressor case usually heats up and grows faster than the rotor which contains the rotor blades, and this transiently opens the gap between the rotor blade end and shroud which can lead to compressor stall. In addition, with a rotor drum configuration, the split cases can go out-of-round during transients and this can further reduce the compressor stall margin.

To minimize the excursions in rotor tip clearance during transients, the state-of-the-art incorporates a "Case-tied" design that more closely matches the case and rotor growths by having additional structure and weight in the compressor case. The casing treatment herein can be an alternative to the Case-tied structure since it can provide increased stall margin for a situation where the tip clearances open transiently, thus permitting the compressor to operate stably with lightweight cases that grow faster than the rotor.

Another application of the invention can be to reduce the use of variable stator vanes in compression stages which are primarily required to provide adequate part-speed stall margin. Often the front stages are tip limited at part-speed especially with fixed front stage stator vanes so that the application of the casing treatment herein can provide sufficient stall margin with reduced variable stator vane rows without incurring a performance penalty.

These applications can be accomplished in the compressor section by removing the low rotor momentum flow which can be up to 12 percent of the total air passing through the compressor. The swirl component is removed or reversed attendant the removed air.

Figure 1:
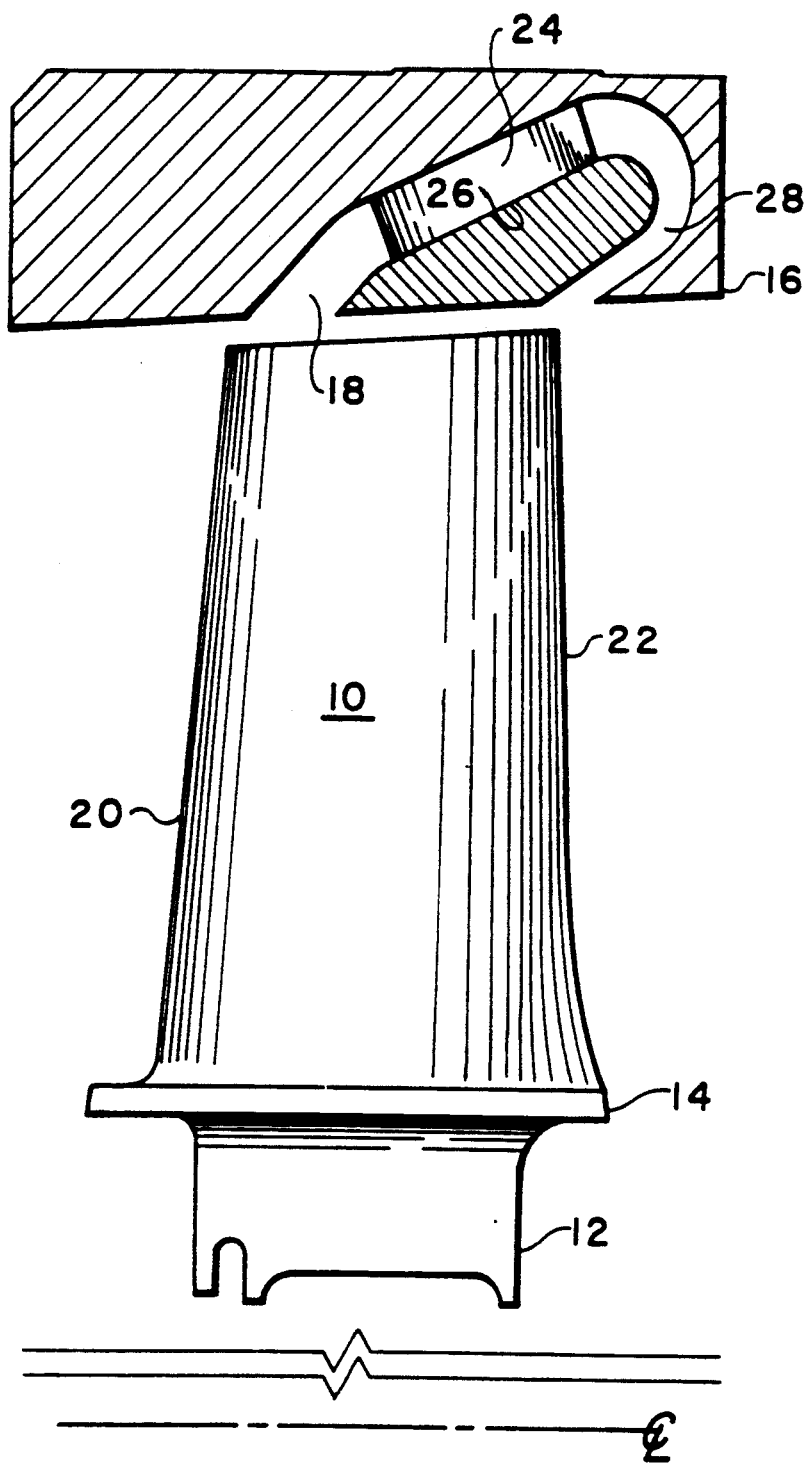
FIG. 1 is a schematic illustration of a compressor blade and shroud representing the compression stage of an axial flow compressor for a gas turbine power plant powering aircraft.
Figure 2:
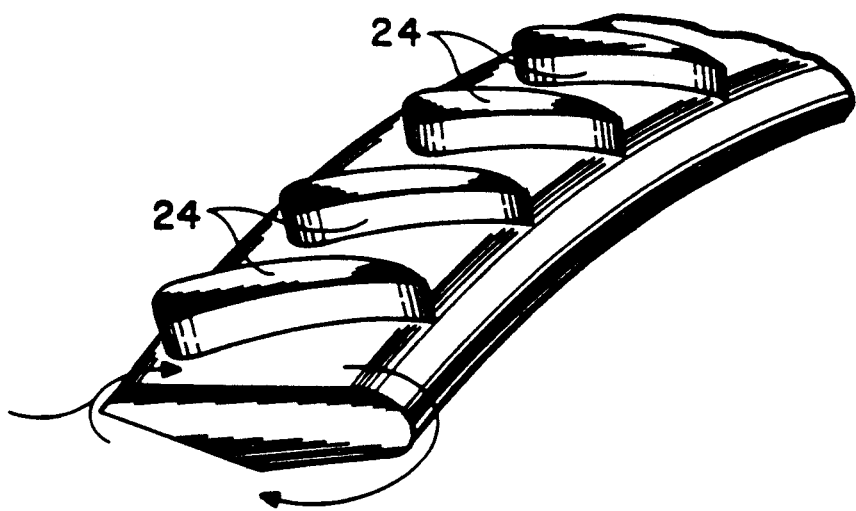
FIG. 2 is a partial section taken through lines 2—2 of FIG. 1.

As best shown in FIGS. 1 and 2, the axial flow blade 10 (one of many circumferentially spaced axial flow blades being shown) is rotably supported in hub 12 for compressing the air in the flow stream of a gas turbine engine. It being noted that the flow stream is constrained between the boundaries provided by the platform and the outer air seal or shroud 16. Low rotor relative momentum flow near the casing shroud is removed through passageway 18 located in proximity to the trailing edge 20 of blade 10. The removed air is treated so as to remove or reverse the swirl component by flowing radially and forwardly toward the leading edge 22 of blade 10 in passageway 26. Suitable reverse swirl vanes 24 are disposed in passaqeway 26 and this flow is then turned substantially nearly 180° by passageway 28 and reintroduced into the main flow adjacent the leading edge 22. Passageways 18, 26 and 28 are annularly shaped and vanes 24, disposed angularly relative to the main air flow, are circumferentially spaced in annular passageway 26. The forward facing wall 29 formed in passage 28 is judiciously angled so that the flow near the casing, which can eventually stall the compressor, is selectively recirculated and is injected back into the gas path at high velocity while strong axial flow tends to remain in the gas path and is not recirculated. This tends to avoid recirculating air more than once which would otherwise be detrimental to compressor efficiency.

There are several design criteria that are necessary in order to achieve an efficacious vane passage treatment that will be satisfactory for aircraft application. Basically, the advantage for utilizing vane passage treatment must outweigh any deficit, particularly in view of the additional weight and manufacturing complexities. According to this invention, the vane passage case treatment serves to recover the energy of the wake or defect leaving the rotor tip (or cantilevered stator parts) and turn the flow to an essentially axial direction.

Hence, the inlet 28 to the vane passage case treatment must be configured to be selective to accept more wake that core fluid. For a given static pressure depression at the intake section at inlet 18, the fluid having low axial velocity (wake) will more easily to make the turn into inlet 18. The high axial velocity fluid will not achieve the tight radius or curvature required to flow into inlet 18. the design constraint will be dependent on a trial and error procedure, although the calculations based on cascade aerodynamic flow can achieve an imperial value which can be used as a base design.

The design of the exit passage 28 also has no geometric constraints and one can also through knwon cascade fluid flow theory imperially arrive at a base design. It is, however, critical that the ratio of $\Delta P/Q$ be equal to or less than the non-dimensional value of 1.5; where $\Delta P$ equals the pressure at the discharge end of exit 18 (represented by reference letter A) minus substantially the minimum pressure of the flow measured at the junction where the flow turns leaving vanes 24 (represented by reference letter B) and Q equals $\frac{1}{2}\rho V^2$ where "$\rho$" (RHO) is the density of the fluid and "V" is the velocity of the fluid.

Although this invention has been shown and described with respect to the detailed embodiments thereof, it will be understood by those skilled in the art that various changes in form and detail thereof may be made without departing from the spirit and scope of the claimed invention.

We claim:

1. For a gas turbine engine having a compressor including a rotor having a plurality of axial flow compressor blades subjected to being aerodynamically stalled, an outer shroud surrounding said compressor blades defining the outer boundary for the main flow path, a passageway formed in said outer shroud having an inlet and an outlet, said inlet being disposed downstream of the leading edges of said compressor blades and an outlet being disposed in proximity to said leading edges, said passageway being dimensioned so that no more than 12% of the total flow passing through said rotor flows through said passageway, anti-swirl vanes in said passageway for removing the swirl component of the rotor relative low momentum flow being removed from said main flow, and said inlet being oriented with respect to the main flow path to selectively remove from the main flow path solely the low momentum flow relative to the rotor that has low axial velocity but high absolute tangential velocity and prevent the strong relative flow that has high axial velocity to enter said passageway said passageway being curved to direct flow toward said inlet and said outlet is oriented with respect to the main flow such that the ratio of the differential of the minimum pressure measured between said curved portion and said outlet and the pressure at said discharge end of said outlet to the value of $\frac{1}{2}\rho V^2$ is equal to or less than 1.5, where "$\rho$" is the density of the fluid and "V" is the velocity of the fluid.

2. For a gas turbine engine as claimed in claim 1 wherein said outlet is shaped to inject the treated low momentum flow substantially parallel to said main flow stream.

3. For a gas turbine engine as claimed in claim 2 wherein said passageway is dimensioned to inject the treated low momentum flow at a higher velocity than the velocity of the flow of the low momentum flow in said inlet.

4. For a gas turbine engine as claimed in claim 3 wherein said inlet is oriented with respect to said main flow path to accept the wake or defect of the flow leaving said compressor blade to recover the energy imparted to the flow from the rotation of said rotor.

* * * * *

UNITED STATES PATENT AND TRADEMARK OFFICE
CERTIFICATE OF CORRECTION

PATENT NO. : 5,282,718
DATED : February 1, 1994
INVENTOR(S) : Steven G. Koff et al It is certified that error appears in the above-identified patent and that said Letters Patent is hereby corrected as shown below:

Col. 3, line 4, "processes" should read --precesses--.

Col. 5, line 21, "knwon" should read --known--.

Signed and Sealed this

Twenty-sixth Day of July, 1994

Attest:

BRUCE LEHMAN

*Attesting Officer*     *Commissioner of Patents and Trademarks*